US009356788B2

(12) United States Patent
Dahl

(10) Patent No.: US 9,356,788 B2
(45) Date of Patent: May 31, 2016

(54) METHOD AND APPARATUS FOR USE IN AN IP MULTIMEDIA SUBSYSTEM

(75) Inventor: Jan Dahl, Alvsjo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1071 days.

(21) Appl. No.: 13/380,239

(22) PCT Filed: Jun. 22, 2009

(86) PCT No.: PCT/EP2009/057747
§ 371 (c)(1),
(2), (4) Date: Dec. 22, 2011

(87) PCT Pub. No.: WO2010/149203
PCT Pub. Date: Dec. 29, 2010

(65) Prior Publication Data
US 2012/0102211 A1 Apr. 26, 2012

(51) Int. Cl.
*G06F 15/16* (2006.01)
*H04L 12/14* (2006.01)
*H04M 15/00* (2006.01)
(Continued)

(52) U.S. Cl.
CPC ............ *H04L 12/14* (2013.01); *H04L 12/1425* (2013.01); *H04L 65/1006* (2013.01);
(Continued)

(58) Field of Classification Search
CPC . H04M 15/57; H04L 65/1006; H04L 65/1016
USPC ........................................................ 709/228
See application file for complete search history.

(56) References Cited

U.S. PATENT DOCUMENTS

2008/0056304 A1\* 3/2008 Koskinen ................ H04L 12/14
370/486
2009/0088129 A1\* 4/2009 Cai ..................... H04L 12/1403
455/406

(Continued)

FOREIGN PATENT DOCUMENTS

EP 1 235 382 A2 8/2002
EP 1 713 293 A1 10/2006
(Continued)

OTHER PUBLICATIONS

Garcia-Martin, et. al. RFC 3455: 3GPP SIP P-Header Extensions; Jan. 2003, 24 pages.\*

*Primary Examiner* — Jerry Dennison

(57) ABSTRACT

A method is provided for use in an IP Multimedia Subsystem, IMS, in which a session control protocol (such as the Session Initiation Protocol, SIP) is used to establish and manage sessions within the IMS. The method comprises using session control protocol messages (such as Session Initiation Protocol messages) to carry node-specific charging information, where the charging information is required for charging purposes at a charging control system of the IMS. A private header part (such as a P-Charging-Vector header) of the session control messages may be used to carry the node-specific charging information. The node-specific charging information may comprise charging data and at least one of: an indication of the type of the charging data; a name or identifier of the node, allowing the node to update charging data which relates to the node and which is carried by a session control message received by the node; and an indication of the version of the charging data, a different version indication being used to indicate different charging data; node name; version number; data name; and value. At least one session control protocol message may be used to carry node-specific charging information relating to a plurality of different nodes.

13 Claims, 4 Drawing Sheets

(51) Int. Cl.
*H04W 4/24* (2009.01)
*H04L 29/06* (2006.01)

(52) U.S. Cl.
CPC ............... *H04L69/22* (2013.01); *H04M 15/57* (2013.01); *H04W 4/24* (2013.01); *H04L 65/1016* (2013.01); *H04M 2215/204* (2013.01); *H04M 2215/208* (2013.01)

(56) References Cited

U.S. PATENT DOCUMENTS

| | | | | |
|---|---|---|---|---|
| 2010/0304710 | A1* | 12/2010 | Sharma | H04M 15/00 455/406 |
| 2011/0035446 | A1* | 2/2011 | Goermer | H04L 12/14 709/204 |
| 2012/0059749 | A1* | 3/2012 | Sharma | G06Q 30/04 705/34 |

FOREIGN PATENT DOCUMENTS

| | | | |
|---|---|---|---|
| JP | H10-093738 | 4/1998 | |
| JP | 2004-356983 A | 12/2004 | |
| WO | WO 2004/102943 A1 | 11/2004 | |
| WO | WO 2008/019602 A1 | 2/2008 | |
| WO | WO 2008026154 A2 * | 3/2008 | ............... H04L 12/14 |
| WO | WO 2009/056174 A1 | 5/2009 | |

* cited by examiner

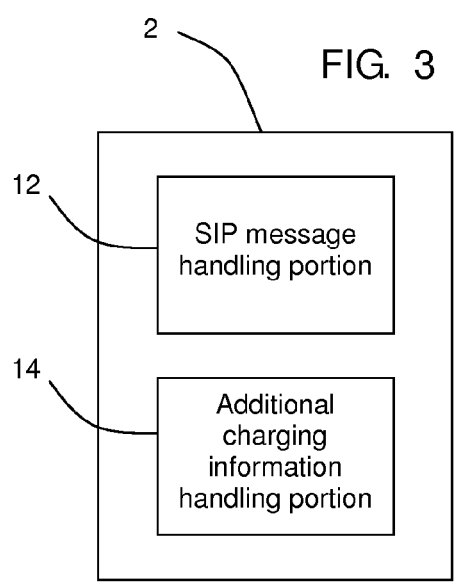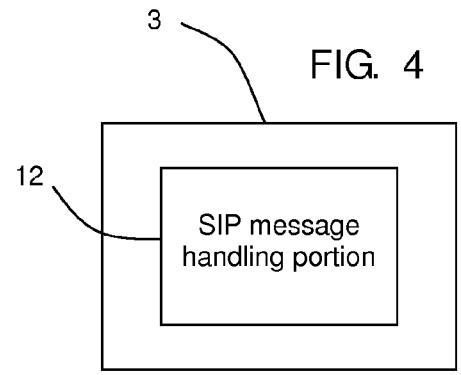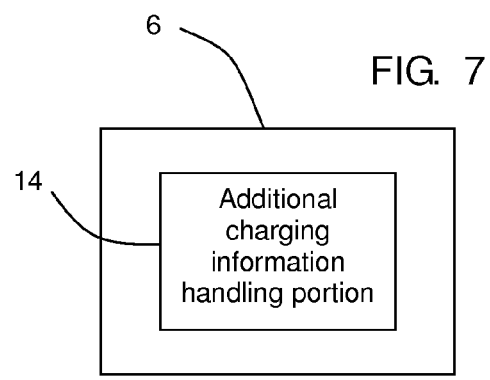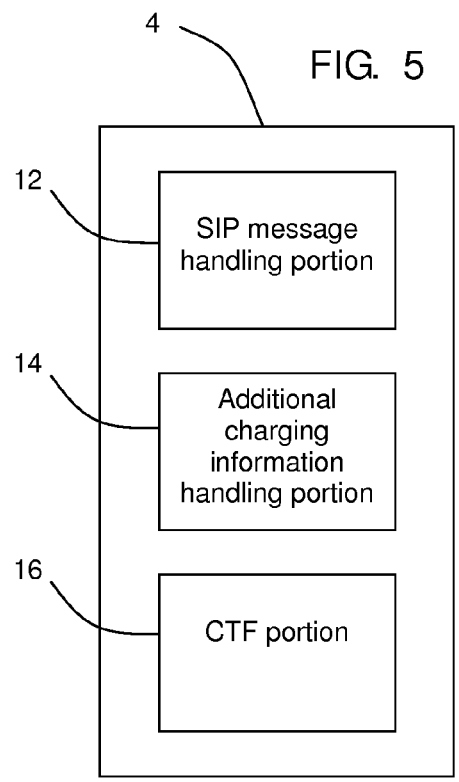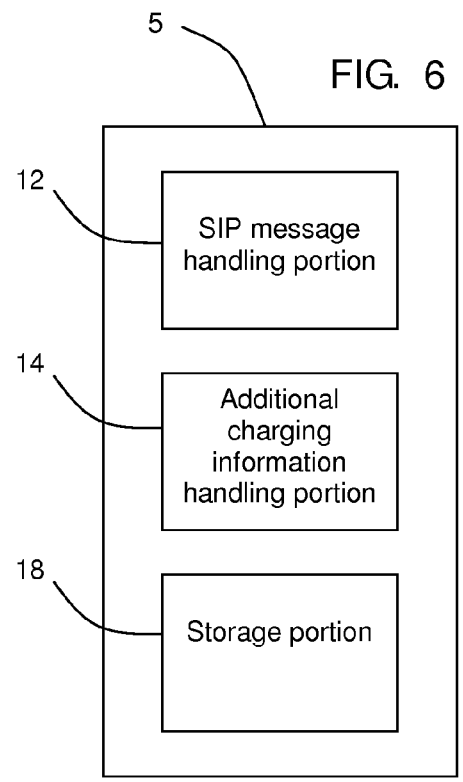

METHOD AND APPARATUS FOR USE IN AN IP MULTIMEDIA SUBSYSTEM

TECHNICAL FIELD

The present invention relates to a method and apparatus for use in an IP Multimedia Subsystem.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. During the registration process, it is the responsibility of the I-CSCF to select a S-CSCF if a S-CSCF is not already selected. The I-CSCF receives the required S-CSCF capabilities from the home network's Home Subscriber Server (HSS), and selects an appropriate S-CSCF based on the received capabilities. It is noted that the allocation of an S-CSCF is key to controlling (and charging for) user access to IMS-based services.

When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface.

3GPP TS 32.240 and 3GPP TS 32.260 define the IMS charging architecture and principles and thereby defines when to send charging information and when not to send charging information.

In the context of any service execution, at least one charging determination (or triggering) point must exist, either for generating accounting records (for offline charging) or for requesting quota/authorization (for online charging) for this particular service or session. Offline charging is a post-paid type of charging scheme whereby charging is performed after a service has been consumed by the user; for example the user might receive a monthly bill showing chargeable items from the previous month. Online charging is a pre-paid type of charging scheme, where network entities would consult with the charging system before allowing a user access to the requested service (strictly speaking, online charging can be used for post-paid as well; normally it is pre-paid but it can also be used to serve as spending control, setting usage limits at service introductions and so on).

According to 3GPP TS 32.260 and 3GPP TS 32.299, different IMS nodes can act as Charging Triggering Functions (CTFs); in particular, either the S-CSCF or the ASs (or both) can act as CTF for most traffic events and all service invocations. The Charging Triggering Functions are adapted to generate charging information for a service/event and to send that information to a Charging Control System. This information can then be used, for example, when billing the user or at inter-operator settlements.

The present applicant has appreciated the following problem with the situation as it is currently specified.

Since, as mentioned above, a number of different IMS nodes can act as Charging Triggering Functions (CTFs), and since each such node has its own unique function, the data available for a CTF will generally differ from CTF to CTF, and thus also the charging information generated. A certain charging model used by an operator may require charging data from more than one CTF to be able to perform correct rating of the service/event.

Consolidation of data from different CTFs costs time and resources and is normally avoided if at all possible in the case of offline charging (Rf interface). Consolidation of data in real-time is not generally feasible, which generally rules out consolidation of online data (Ro interface).

Assuming that the same or similar rating decisions are taken for user charging, irrespective of whether offline or online charging is used, the charging models should be constructed so that consolidation is avoided as far as possible; however this is not always possible, or it will hamper differentiation of services and tariffs.

It is desirable to address the above issue as identified and explained by the present applicant.

SUMMARY

According to a first aspect of the present invention there is provided a method for use in an IP Multimedia Subsystem, IMS, in which a session control protocol is used to establish and manage sessions within the IMS, comprising using session control protocol messages to carry node-specific charging information required for charging purposes at a charging control system of the IMS.

As an example, the session control messages may be Session Initiation Protocol messages.

The method may comprise using a private header part of the session control messages to carry the node-specific charging information. The private header may be a P-Charging-Vector header. (It will be appreciated that the node-specific charging information does not include information identifying (such as the address of) the node that generated the IMS Charging Identity value in the P-Charging-Vector header.)

The node-specific charging information may comprise charging data and at least one of: an indication of the type of the charging data; a name or identifier of the node, allowing the node to update charging data which relates to the node and which is carried by a session control message received by the node; and an indication of the version of the charging data, a different version indication being used to indicate different charging data.

The method may comprise using at least one session control protocol message to carry node-specific charging information relating to a plurality of different nodes.

The method may comprise receiving a session control protocol message carrying the node-specific charging information, and including the received node-specific charging information in a session control protocol message sent in response to or forwarding the received message.

The method may comprise receiving a session control protocol message carrying the node-specific charging information, storing the received node-specific charging information, and not including the received node-specific charging information in a session control protocol message sent outside the IMS in response to or forwarding the received message.

The method may comprise including the stored node-specific charging information in a session control protocol message sent within the IMS in response to or forwarding a subsequent message received from outside the IMS.

The method may comprise receiving a session control protocol message carrying the node-specific charging information, and including the received node-specific charging information carried by the received message in a charging message sent to the charging control system.

The method may comprise including further node-specific charging information relating to a further node in addition to the received/stored node-specific charging information. The further node is, for example, that node which is sending the message.

The further node-specific charging information may be arranged in such a way as to allow the further node subsequently to access that information or parts thereof, for example for removing or updating.

According to a second aspect of the present invention there is provided an apparatus for use in a node of an IP Multimedia Subsystem, IMS, in which a session control protocol is used to establish and manage sessions within the IMS, the apparatus comprising means for using session control protocol messages to carry node-specific charging information required for charging purposes at a charging control system of the IMS.

According to a third aspect of the present invention there is provided a program for controlling an apparatus to perform a method according to the first aspect of the present invention or which, when loaded into an apparatus, causes the apparatus to become an apparatus according to the second aspect of the present invention. The program may be carried on a carrier medium. The carrier medium may be a storage medium. The carrier medium may be a transmission medium.

According to a fourth aspect of the present invention there is provided an apparatus programmed by a program according to the third aspect of the present invention.

According to a fifth aspect of the present invention there is provided a storage medium containing a program according to the third aspect of the present invention.

An embodiment of the present invention offers a technical advantage of addressing the issue mentioned above relating to the prior art. Technical advantages are set out in more detail below.

BRIEF DESCRIPTION OF THE DRAWINGS

FIG. 3 is a schematic block diagram showing parts of the MGCF of FIG. 2;

FIG. 4 is a schematic block diagram showing a part of the CSCF of FIG. 2;

FIG. 5 is a schematic block diagram showing parts of the AS of FIG. 2;

FIG. 6 is a schematic block diagram showing parts of the IBCF of FIG. 2;

FIG. 7 is a schematic block diagram showing a part of the Charging Control System of FIG. 2.

DETAILED DESCRIPTION

Figure 1:
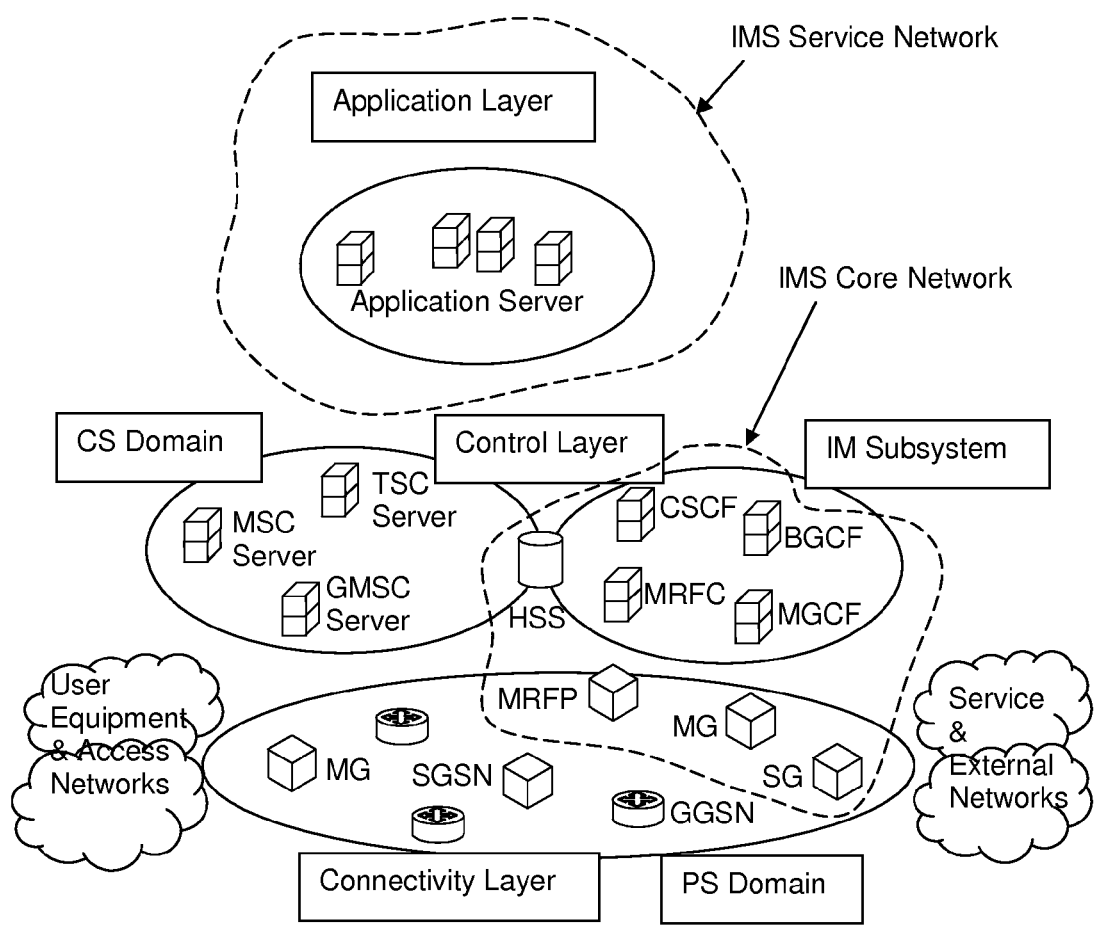
FIG. 1, discussed hereinbefore, illustrates schematically the integration of an IP Multimedia Subsystem into a 3G mobile communications system.

An embodiment of the present invention is aimed at providing a generic mechanism for sending and handling charging-related data between IMS nodes to enable a single CTF generating charging data not only for its own services but also include data from other nodes. This will make it possible to remove or at least reduce the need for consolidation of charging data by the Charging Control System.

Certain nodes within an IMS system would, according to an embodiment of the present invention, be able to use SIP signalling to carry data relevant for charging decisions made by the Charging Control System, with each such node adding its own charging data to the SIP signalling. One possible container for this data is a Private header, e.g. the P-Charging-Vector (PCV) header defined in RFC 3455 "Private Header (P-Header) Extensions to the Session Initiation Protocol (SIP) for the 3rd-Generation Partnership Project (3GPP)" and with usage and extensions defined in 3GPP TS 24.229 "IP multimedia call control protocol based on Session Initiation Protocol (SIP) and Session Description Protocol (SDP); Stage 3", but it can also be achieved in other ways.

In this respect, and by way of background, the P-Charging-Vector header is defined in RFC 3455 to address an issue that 3GPP has a distributed architecture that results in multiple network entities becoming involved in providing access and services. The P-Charging-Vector header was provided as a way of correlating charging records generated from different entities that are related to the same session. The correlation information carried by the P-Charging-Vector header includes a globally-unique charging identifier, the IMS Charging Identity (ICID) value, that simplifies subsequent billing by enabling correlation of charging records. Apart from the ICID, the P-Charging-Vector header includes the address of the SIP proxy that creates the ICID value, and the Inter Operator Identifier (IOI); the IOI identifies both the originating and terminating networks. A proxy may include the P-Charging-Vector header, if not already present, in either the initial request or response. According to RFC 3455, only one instance of the header must be present in a request or response. Where a proxy receives a request that does not contain a P-Charging-Vector header, it may insert one, with those parameters that are available at the proxy.

In an embodiment of the present invention, additional node-specific charging data (rather than merely correlation information) is added to SIP requests and their responses (both session related and unrelated) by the various IMS nodes. The additional (node-specific) charging data added by a node can be added in a structured way, so that the node is able to find its own data in the SIP signalling, if required, for example to remove or update it later in the same session. The additional charging data is also identifiable for the Charging Control System to simplify its further actions, which can be achieved by including within or associated with the additional charging data a node name, version number, data name and value, for example.

Figure 8:
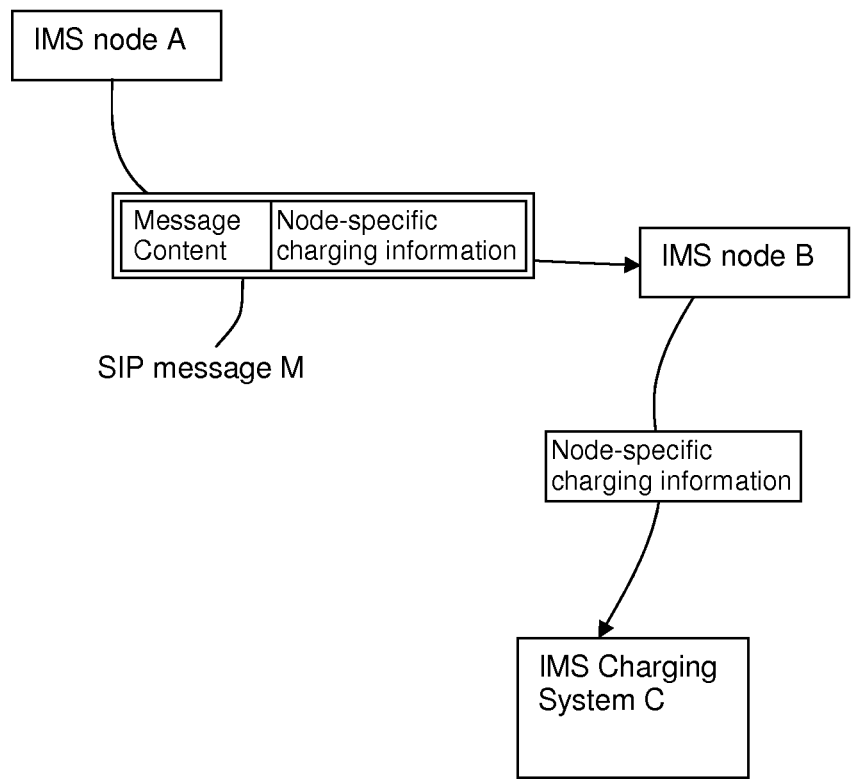
FIG. 8 is a schematic representation of a scheme embodying the present invention.

In a general sense, and referring to the schematic illustration in FIG. 8, a method embodying the present invention can be seen as one of using a SIP message M (or other such session control protocol message where SIP is not used as the session control protocol for establishing and manage sessions within the IMS) to carry node-specific charging information required for charging purposes at a charging control system C of the IMS. While FIG. 8 illustrates the SIP message M being sent from an IMS node A to an IMS node B, the SIP message M carrying node-specific charging information which is then sent onward to the charging control system C, the node-specific charging information carried by the SIP message M may relate to a node other than node A.

For the purpose of an embodiment of the present invention, an extension of the PCV header might appear as follows, using the usual Augmented Backus-Naur Form (ABNF) syntax of RFC 2234:

additional-charging-info = (charging-info / generic-param)
charging-info = "charging-info" EQUAL node [SEMI host] SEMI version

*(SEMI ims-charging-info) *(SEMI extension-param)
node = "P-CSCF / "S-CSCF" / "I-CSCF" / "E-CSCF" / "MRFC" / "MGCF" / "AS" / "IBCF" / token
version = 1*DIGIT
ims-charging-info = data-type EQUAL gen-value
data-type = gen-value When sending an Accounting-Request (Rf) or a Credit-Control-Request (Ro), a CTF could send this additional charging data in a dedicated Attribute Value Pair (AVP). This may be done by using one instance per node, i.e. all data added by a certain node is sent in one and the same AVP; for example: *[Additional-Charging-Data].

The additional charging data is generally of value only within an IMS system. This means that the data can be removed when leaving the IMS system and removed if received when entering the IMS system, i.e. handled very much like the P-Charging-Function-Addresses header according to 3GPP TS 24.229 "IP multimedia call control protocol based on Session Initiation Protocol (SIP) and Session Description Protocol (SDP); Stage 3".

The completeness of the additional charging data reported to Charging Control depends on the behaviour of the IMS system. The standard behaviour for a proxy node is to forward what was received but other types of nodes can behave differently. They can, for example, reject the transaction due to unknown data, discard the data or forward it as-is. The handling of the additional charging data needs to be defined; for example as to whether it is forwarded, or copied from the request to the response in the edge nodes, or if each CTF needs to store what was received in both SIP requests and SIP responses to be able to send all data to the Charging Control System.

Figure 2:
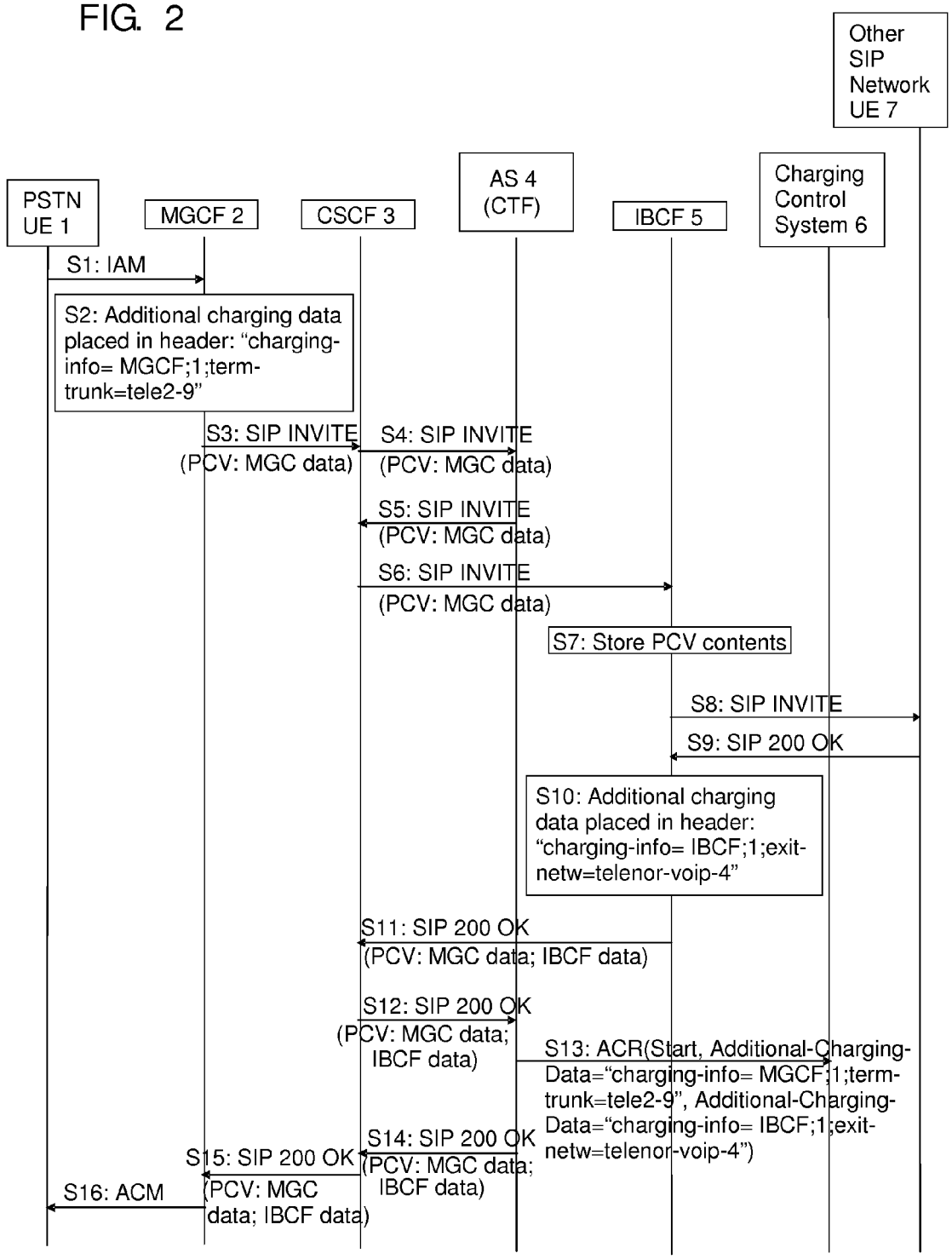
FIG. 2 is a message exchange diagram illustrating operation according to an embodiment of the present invention.

A more detailed description of a method and apparatus embodying the present invention will be now provided with reference to FIGS. 2 to 7. FIG. 2 shows a signalling sequence involving the following IMS entities: a PSTN UE 1, a Media Gateway Controller Function (MGCF) 2, a CSCF 3, an AS 4, an Interconnection Border Control Function (IBCF) 5, and a Charging Control System 6. The AS 4 acts as the CTF for a service provided to the UE 1, with the AS 4 (acting as CTF) communicating with the Charging Control System 6. Also shown in FIG. 2 is a UE 7 from another SIP network.

FIGS. 3 to 7 are schematic block diagrams relating respectively to the MGCF 2, CSCF 3, AS 4, IBCF 5, and Charging Control System 6. Each of the MGCF 2, CSCF 3, AS 4 and IBCF 5 comprises a SIP message handling portion 12. Each of the MGCF 2, AS 4, IBCF 5 and Charging Control System 6 comprises an additional charging information handling portion 14. The AS 4 comprises a CTF portion 16. The IBCF 5 comprises a storage portion 18.

Referring to the signalling diagram of FIG. 2, in step S1 an Initial Address Message (IAM) is sent from the UE 1 to the MGCF 2. In step S3, the SIP message handling portion of the MGCF 2 generates and sends a SIP INVITE to the CSCF 3. However, prior to sending the SIP INVITE message, in step S2 the SIP message handling portion 12 of the MGCF 2 co-operates with the additional charging information handling portion 14 of the MGCF 2 to insert into the SIP INVITE message some additional charging information relating to the MGCF 2. This additional charging information will ultimately be required by and sent to the Charging Control System 6, and in this example is inserted into and carried by the SIP INVITE message using a PCV header.

The SIP INVITE message sent in step S3 is received by the SIP message handling portion 12 of the CSCF 3 and forwarded in step S4 to the AS 4, including any additional charging information (in this case just the additional charging information relating to the MGCF 2). In this example, there is no need for the CSCF 3 itself to insert any additional charging information. It is also apparent that it is not necessary for the CSCF 3 to process the content of the PCV header in any way, or even to know that the PCV header contains charging information; it merely forwards the PCV header in step S4 without analysis.

In step S5 the SIP message handling portion 12 of the AS 4 sends a SIP INVITE message back to the CSCF 3, including any additional charging information in the PCV header, again without actually requiring to know that the PCV header contains charging information at all. In step S6, the SIP message handling portion 12 of the CSCF 3 forwards the SIP INVITE message to the IBCF 5, again including any additional charging information that may be present (in this example, the additional charging information relating to the MGCF 2).

The SIP message handling portion 12 of the IBCF 5 co-operates with the additional charging information handling portion 14 of the IBCF 5 to extract the contents of the PCV header (i.e. the additional charging information), and arranges for this to be stored in the storage portion 18. The additional charging information is placed in the storage portion 18 because the SIP INVITE message is being forwarded to the UE 7 located in another SIP network. In step S8, therefore, the IBCF 5 forwards the SIP INVITE message to the UE 7, and in step S9 the UE 7 responds with a SIP 200 OK message, which is received and handled by the SIP message handling portion 12 of the IBCF 5.

In step S11 the SIP 200 OK message is forwarded to the CSCF 3, but before doing so, in step S10, the previously-stored PCV header contents are retrieved from the storage portion 18 and inserted into a PCV header of the SIP 200 OK message, together with further charging information relating specifically to the IBCF 5, which is created by the additional charging information handling portion 14 of the IBCF 5.

In step S12, the SIP 200 OK message is forwarded to the AS 4 by the SIP message handling portion 12 of the CSCF 3, together with any additional charging information; at this stage the SIP message is carrying additional charging information relating both to the MGCF 2 and to the IBCF 5.

In step S13, the additional charging information handling portion 14 of the AS 4 extracts the additional charging information carried by the SIP 200 OK message and the CTF portion 16 of the AS 4 generates and sends an ACR charging message to the Charging Control System 6. The ACR message includes the MGCF-specific charging information and the IBCF-specific charging information carried to the AS 4 by the SIP messages. The Charging Control System 6 uses this information for charging purposes.

In step S14 the SIP message handling portion 12 of the AS 4 forwards the SIP 200 OK message, including any additional charging information, to the CSCF 3, which in turn forwards the SIP 200 OK message in step S15 to the MGCF 2, again including any additional charging information.

Finally, the MGCF 2 replies to the UE 1 in step S16 with an ACM message.

The charging model described above uses information about originating and terminating networks for correct rating decisions, and data is therefore used from both edge nodes 2 and 5. Without a scheme according to an embodiment of the present invention, both edge nodes 2 and 5 would have to send charging data to the Charging Control System 6, which would then have to correlate and consolidate charging data from three sources to be able to apply the correct rate. In the embodiment of the present invention described above, the edge nodes 2 and 5 are providing the additional charging information in the PCV header. To make it possible for a CTF to find all data in one place (without having to store data from requests and responses) the edge nodes 2 and 5 copy the data from request to response and the AS 4, working as a Back-to-Back User Agent (B2BUA), copies the data from one call leg to another.

Using an embodiment of the present invention it becomes possible to reduce and possibly remove the need for consolidation of charging data. It also becomes possible to make rating decisions in real-time (online) based on data from more than one node. A mechanism is provided to send data to the Charging Control System in a flexible way when a specific Attribute Value Pair (AVP) is not available or feasible to create. With an embodiment of the present invention a CTF is able to send data to the Charging Control System without having to know exactly what it sends. It is also possible to mix nodes from different vendors without losing node-specific charging data. An embodiment of the present invention also enables market adaptations or temporary solutions with as few impacted nodes as possible. An embodiment of the present invention enables deployment of a consistent charging model over IMS even if nodes are replaced. By reducing the need for consolidation, the amount of charging traffic primarily on the Rf interface can also reduced. An embodiment of the present invention enables a reduction in the overall level of charging traffic by avoiding the sending of unnecessary charging information. Furthermore, an embodiment of the present invention is applicable both to online and offline charging models.

It will be appreciated that it is not intended that a method embodying the present invention be used to replace completely any existing mechanism (e.g. using Diameter) for the sending of charging information to the Charging Control System. Rather, a method embodying the present invention can be used in addition to any existing method. For example, where a large amount of charging data is to be sent, it may be considered more appropriate that a node send this data to the Charging Control System in the conventional manner using a known Diameter interface. On the other hand, this is not to preclude that a method embodying the present invention might be used exclusively in a certain situation.

It will also be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

The invention claimed is:

1. A method for use in an IP Multimedia Subsystem (IMS) node in which a session control protocol is used to establish and manage sessions within the IMS using session control protocol messages, comprising the steps of:

receiving, at the IMS node, a first session control protocol message carrying node-specific charging data for a first node required for charging purposes at a charging control system of the IMS; and, including, by the IMS node, both the received first node-specific charging data and additional node-specific charging data relating to the IMS node either in a second session control protocol message sent in response to the received first session control protocol message, or by modifying the received first session control protocol message, such that the second session control protocol message, or the modified first session control protocol message, comprises node-specific charging data relating to a plurality of different nodes, the plurality of different nodes including the first node and the IMS node, wherein node-specific charging data for each of the plurality of different nodes comprises a name or identifier of the node; and transmitting either the second session control protocol message or the modified received first session control protocol message to a single Charge Triggering Function (CTF) to generate charging data for both the first node and the IMS node.

2. The method recited in claim 1, wherein the session control protocol messages are Session Initiation Protocol messages.

3. The method recited in claim 1, comprising using a private header part of the session control messages to carry the node-specific charging data.

4. The method recited in claim 3, wherein the private header is a P-Charging-Vector header.

5. The method recited in claim 1, wherein the session control protocol messages are used to carry the node-specific charging data between nodes within the IMS.

6. The method recited in claim 1, wherein the node-specific charging data for each of the plurality of different nodes comprises information to generate correct charging information from a single message received by the charging control system.

7. The method recited in claim 1, wherein the session control protocol messages include request messages and their responses.

8. The method recited in claim 1, wherein the session control protocol messages include both session related and session unrelated messages.

9. An apparatus for use in a node of an IP Multimedia Subsystem (IMS) in which a session control protocol is used to establish and manage sessions within the IMS, the apparatus comprising:

means for receiving a first session control protocol message carrying node-specific charging data for a first node required for charging purposes at a charging control system of the IMS; and, means for including both the received node-specific charging data for the first node and additional node-specific charging data relating to the IMS node in either a second session control protocol message sent in response to receiving the first session control protocol message, or by modifying the first received message, such that the second session control protocol message or the modified first received message comprises node-specific charging data relating to a plurality of different nodes, the plurality of different nodes including the first node and IMS node, wherein node-specific charging data for each of the plurality of different nodes comprises a name or identifier of the node; and means for transmitting either the second session control protocol message or the modified received first session control protocol message to a single Charge Triggering Function (CTF) to generate charging data for both the first node and the IMS node.

10. The method recited in claim 1, wherein the node-specific charging data for each of the plurality of different nodes further comprises at least one of:
charging data;
an indication of the type of the charging data; or
an indication of the version of the charging data, a different version indication being used to indicate different charging data.

11. The method recited in claim 1, wherein the first node and the IMS node are edge nodes.

12. The method recited in claim 1, wherein the CTF transmits the node-specific charging data to the charging control system in one charging message.

13. The apparatus recited in claim 9, wherein the node-specific charging data for each of the plurality of different nodes further comprises at least one of:
charging data;
an indication of the type of the charging data; or
an indication of the version of the charging data, a different version indication being used to indicate different charging data.

* * * * *